United States Patent [19]
Fackre

[11] 3,737,191
[45] June 5, 1973

[54] EXTENSIBLE CAMPING TRAILER
[76] Inventor: John S. Fackre, 1936 Linden Street, Ridgewood, N.Y. 11227
[22] Filed: Oct. 6, 1971
[21] Appl. No.: 186,862

[52] U.S. Cl. .......................................... 296/27, 52/65
[51] Int. Cl. .............................................. B60p 3/34
[58] Field of Search ..................... 296/26, 27, 23 C, 296/23 R; 52/65, 67, 70, 71

[56] References Cited
UNITED STATES PATENTS
3,038,565  6/1962  Bruce ........................................ 52/65
2,744,042  5/1956  Pace .......................................... 296/31

FOREIGN PATENTS OR APPLICATIONS
665,853  7/1963  Canada ................................... 296/23

Primary Examiner—Philip Goodman
Assistant Examiner—John A. Carroll
Attorney—Michael Ebert

[57] ABSTRACT

A longitudinally and laterally extensible camping trailer formed by a collapsible body supported on a chassis whose rear end is mounted on a set of wheels, the front end thereof being hitchable to a vehicle. The body includes a box-like main housing affixed to the chassis and a similarly shaped sub-housing of slightly smaller volume receivable within the main housing and pivoted thereto, whereby when the sub-housing is rotated 180° about its pivot, the main and sub-housings together form a longitudinally elongated chamber having an open side. Also pivoted to the main housing are a plurality of housing segments which in the collapsed state internest within the main housing, and in the expanded state define a bay section enclosing theopen side of the chamber and laterally expanding the volume thereof.

6 Claims, 8 Drawing Figures

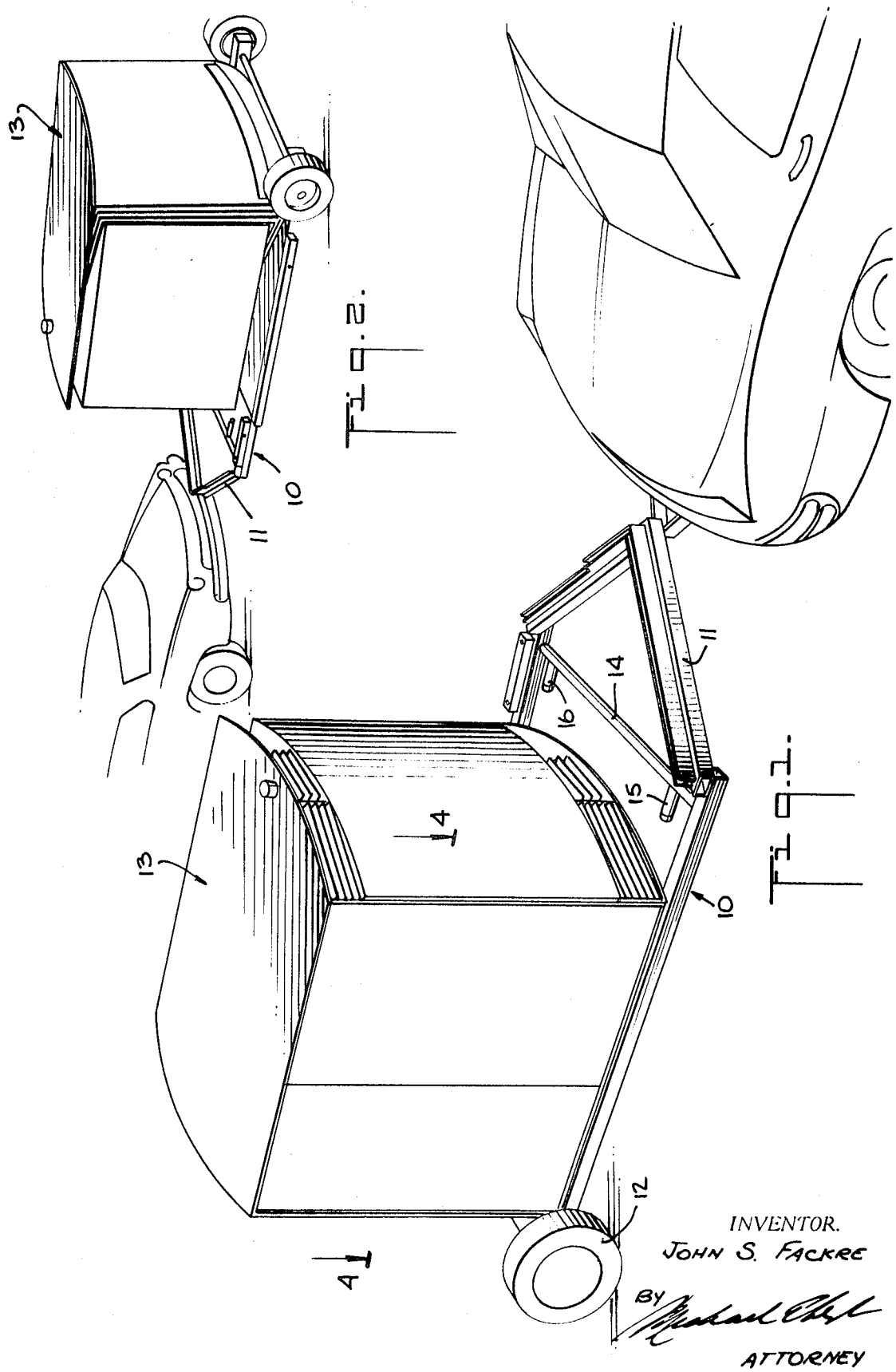

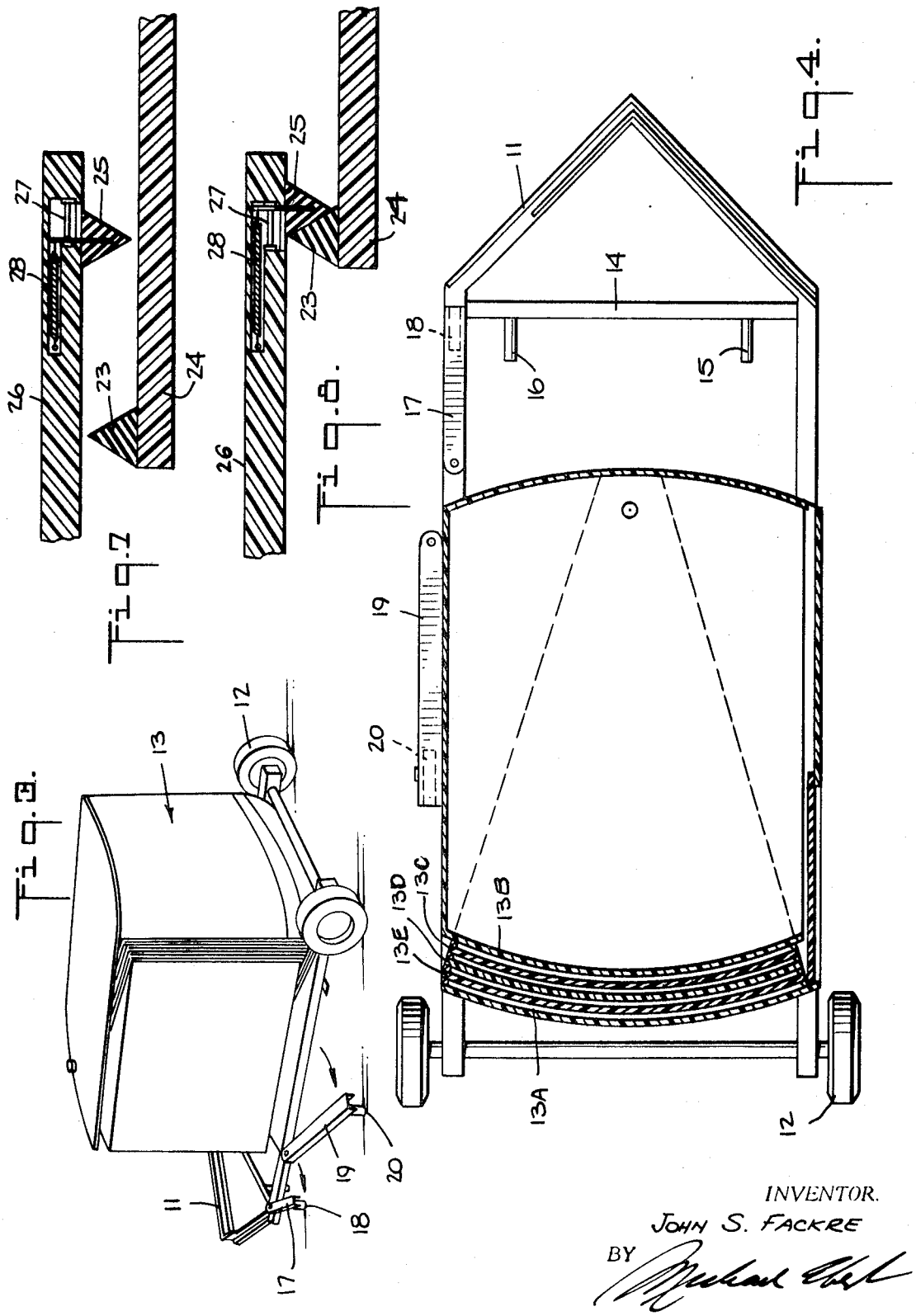

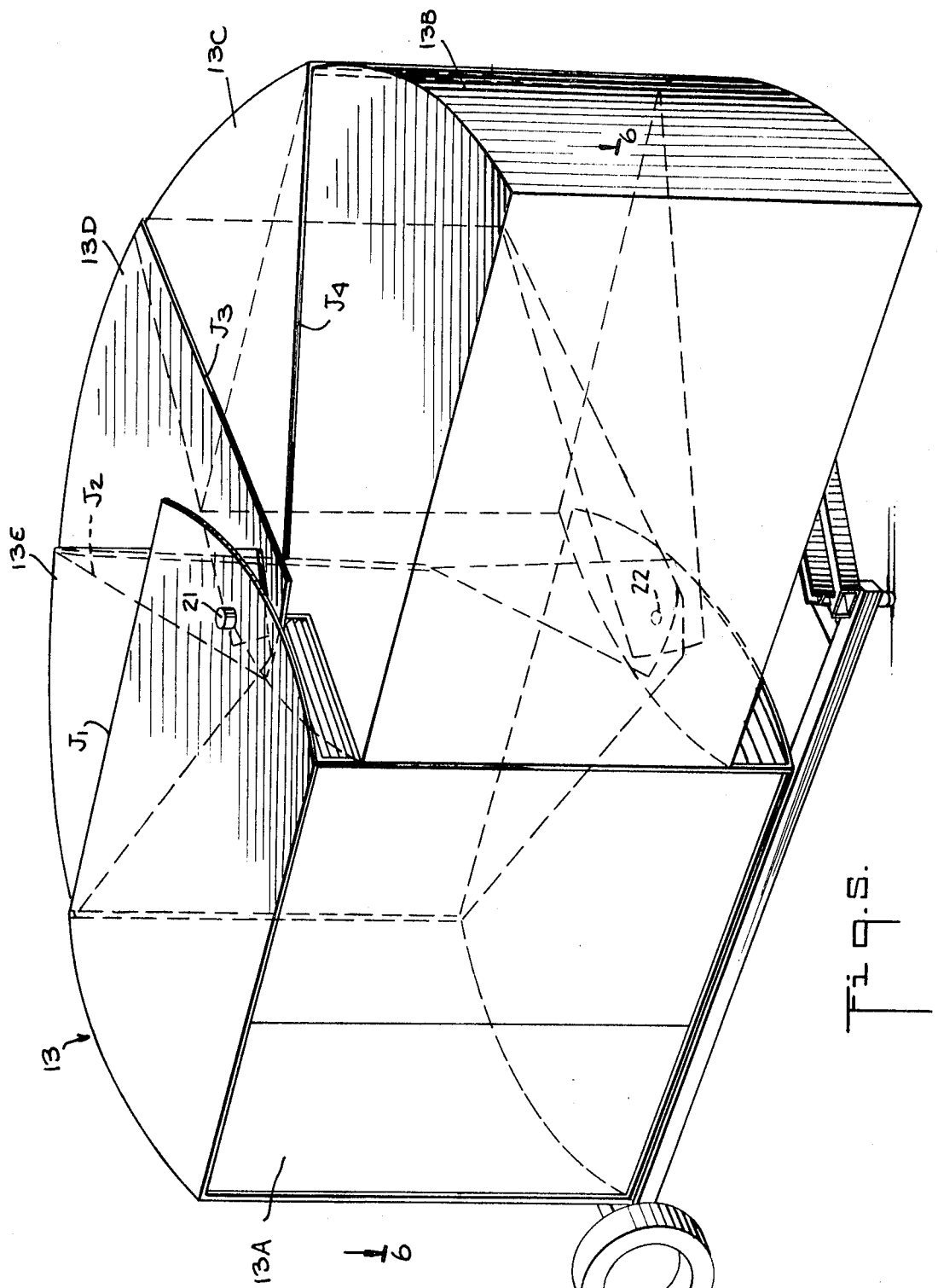

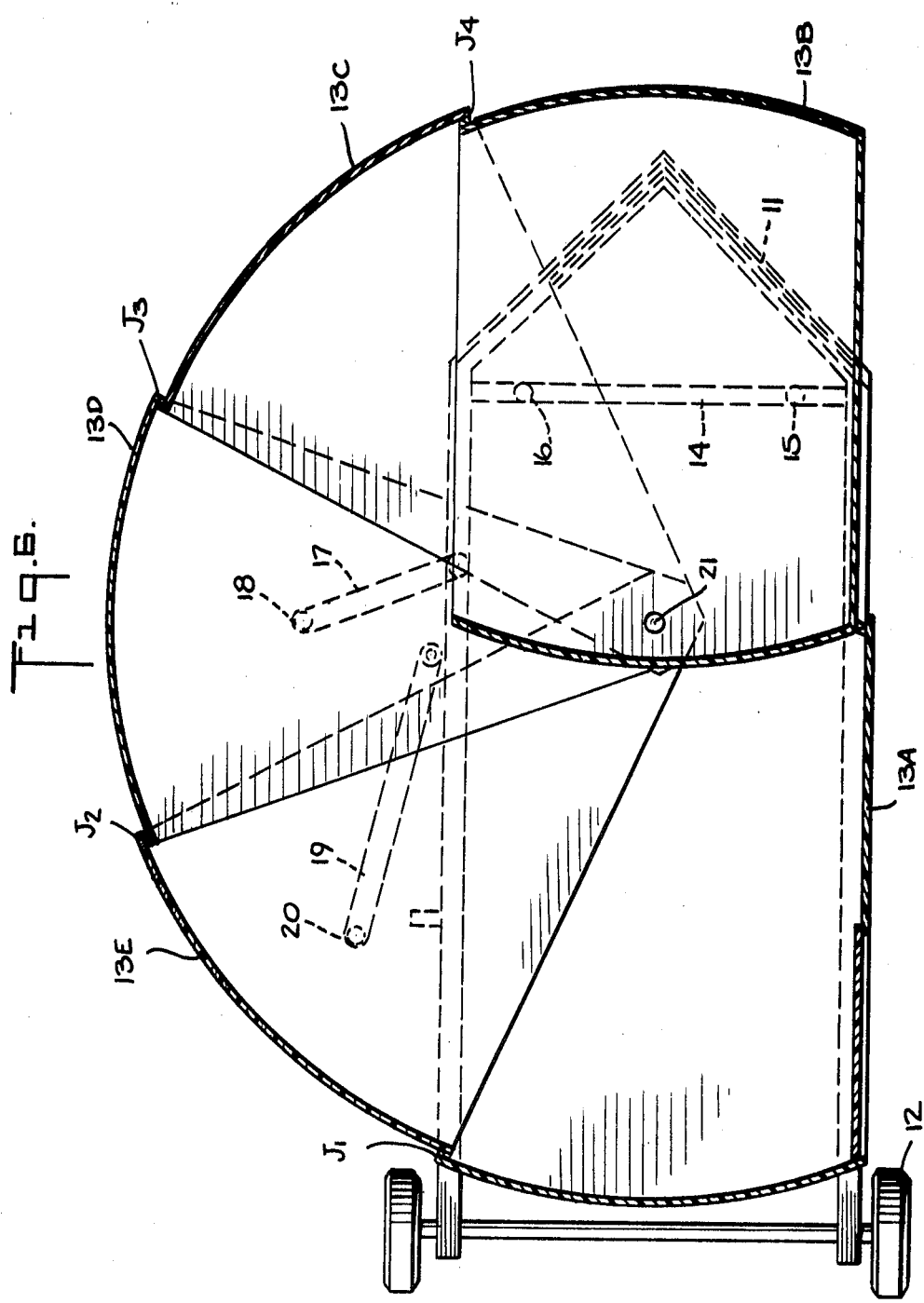

EXTENSIBLE CAMPING TRAILER

BACKGROUND OF THE INVENTION

This invention relates generally to extensible housings, and more particularly to a camping trailer which is readily towable in the collapsed state and affords a commodious accommodation in the expanded state.

With the growing popularity of camping and the enlarged facilities available therefor in state and national parks, the need exists for collapsible housings which may be transported to the camping site and easily erected. Though large-size tents may be used for this purpose, there are practical difficulties which discourage their use. A small foldable tent may be carried by a hiker to a camp site. But where, as is often the case, a group of campers travel by automobile to a remote camp site, then it may not be feasible or desirable to bring along tents.

In a typical situation in which a family vehicle is used to take four to six passengers to a camp site, the vehicle is quite capable of carrying the passengers, but it may not have adequate space for the food supplies, clothing, utensils, stoves and sundry other equipment that camping entails. And even if it were somehow possible to stow in this equipment, no room remains for bulky bags containing tents.

It is for this reason that camping trailers have been developed, both as a carrier for camping equipment, and as a sleeping accommodation for the campers. The trailer, when hitched to the vehicle, must be relatively compact or short in order for the vehicle to be able to negotiate sharp turns. On the other hand, the trailer, when camped, must be sufficiently commodious to provide sleeping quarters for the campers. Because the requirements for roadability and camping are incompatible, camping trailers have been developed having an extensible body, the body being short and compact when on the road, and being expanded when camped.

Thus in U.S. Pat. No. 2,127,580, there is disclosed a camping trailer made of a sectioned main body whose front part is supplemented by a smaller rear section that is adapted to telescope within the main body. When collapsed, the length of the trailer is that of the main body, and when extended the length is that of the combined sections.

In a trailer intended to be towed by a standard automobile, it is important, for reasons of safety, that the width of the trailer not exceed to any great degree the width of the vehicle, for otherwise it becomes difficult for the driver to judge the road requirements of the trailer hitched to his vehicle. Since the width of the standard vehicle is usually not more than 6 ½ feet, this imposes a strict limit on the acceptable width of the trailer.

Hence, though the trailer width is sufficient for carrying camping equipment, the trailer as a housing accommodation for human occupants, leaves much to be desired for however long the trailer housing, it remains narrow and cramped. The volume of a trailer which is only longitudinally extensible may be stepped up but the resultant space distribution is such as to militate against the comfort of the campers.

SUMMARY OF THE INVENTION

In view of the foregoing, it is the main object of this invention to provide an extensible camping trailer which in the collapsed state is highly compact and suitable for towing by a standard passenger vehicle, and in the expanded state affords a commodious, comfortable accommodation for campers.

More specifically, it is an object of this invention to provide a light-weight, all weather trailer of the above-described type, which is extensible both longitudinally and laterally, whereby the resultant accommodation is sizable both in length and breadth.

Also an object of the invention is to provide a trailer of the above type, which may be quickly expanded or collapsed, without the need for special tools or more than ordinary skill.

A further object of the invention is to provide an extensible camping trailer of simple design which may be mass-produced and sold at relatively low cost.

Briefly stated, these objects are attained in an extensible camping trailer formed by a chassis having a collapsible body mounted thereon, the rear end of the chassis being supported on a set of wheels, the front end thereof being hitchable to a towing vehicle.

The body includes a box-like main housing section affixed to the chassis and having an open side and an open end, and a similarly shaped sub-housing section of slightly smaller volume receivable within the main housing section and pivoted thereto, whereby when the sub-housing is rotated 180° about its pivot, the main and sub-housing sections together form a longitudinally elongated chamber having an open side.

Also pivotally connected to the main housing section are a plurality of telescopically arranged housing segments which in the collapsed state fit within the main housing, and in the expanded state define a bay section enclosing the open side of the chamber and laterally expanding the interior volume thereof to provide a commodious accommodation for campers.

While the body is described herein for use in conjunction with a trailer chassis, it is to be understood that it is also usable as a collapsible housing for backyard storage, or any other useful purpose.

OUTLINE OF THE DRAWING

For a better understanding of the invention as well as other objects and further features thereof, reference is made to the following detailed description to be read in conjunction with the accompanying drawings, wherein:

FIG. 1 is a perspective view facing the starboard side of an extensible camping trailer in accordance with the invention, the body of the trailer being illustrated in its collapsed state;

FIG. 2 is a perspective view of the same trailer facing the port side thereof;

FIG. 3 is the same view of the trailer shown in FIG. 2, but detached from the towing vehicle and with its supporting arms extended;

FIG. 4 is a longitudinal section of the body of the trailer, taken in the plane indicated by line 4—4 in FIG. 1;

FIG. 5 is a perspective view of the trailer in the expanded state;

FIG. 6 is a plan view of the trailer in the expanded state;

FIG. 7 is a sectional view of the weatherproofing edges of mating sections of the body when separated from each other; and FIG. 8 shows the weatherproofing edges when in abutting relation.

DESCRIPTION OF THE INVENTION

Referring now to the drawings, and more particularly to FIGS. 1 and 2, there is shown a camping trailer in accordance with the invention, the trailer including a rectangular frame or chassis, generally designated by numeral 10, having a triangular forward or bow section 11, hitched at its apex to a towing vehicle, which may be any conventional automobile or small truck. The rear end of chassis 10 is supported by a wheel set 12 formed by an axle having a pair of wheels thereon. In practice, for a very large and heavy trailer, two wheel sets may be used.

Mounted on top of chassis 10 is a collapsible body, generally designated by numeral 13. In practice, one may provide a shorter trailer than that shown. This is done by arranging the set of wheels 12 so that the wheels and axle are normally positioned below the rear portion of the body 13, rather than displaced therefrom as shown in the figures, thereby improving the roadability of the structure. In this event, it is necessary, when the body is to be expanded, to shift the set of wheels to the position shown in the drawing. For this purpose, the set of wheels is made slidable relative to the rear of the chassis, so that it may be displaced from the road position to the camping position.

Chassis 10 is provided at the junction of the frame and the bow 11 with a cross-arm 14 which is rotatable 90°. A pair of spaced legs 15 and 16 are attached to arm 14, the legs normally lying in the horizontal plane. However, when cross-arm 14 is rotated, legs 15 and 16 extend downwardly to support the front end of the chassis, this being done when the trailer is detached from the towing vehicle which otherwise supports the front end.

Chassis 10, as best seen in FIG. 3, is provided at its port side with a pivoted short arm 17 having a retractable leg 18 at its free end, and a pivoted long arm 19 having a retractable leg 20 at its free end. Short arm 17 is pivotally connected to the frame at a point adjacent bow 11, while long arm 19 is pivoted at a point displaced therefrom to provide, when the short and long arms are outstretched, spaced extensions for supporting sections of the body 13 in the expanded state (see FIG. 6).

Collapsible body 13 is constituted by a main housing section 13A, a sub-housing section 13B and three wedge-shaped housing segments 13C, 13D and 13E, all of which internest in the collapsed state to form a highly compact structure.

The body elements may be fabricated of high-strength, light-weight panels made of reinforced fiber glass or of aluminum having a honeycomb core. Also usable are commercially available types of structural laminates formed of plastic, metal, wood or combinations thereof.

Main housing section 13A has a box-like configuration, the ends thereof being somewhat convex to match the convex curvature of the end walls of the other housing elements, each of which is arranged to swing in an arcuate path about a common pivot point. The front end and the port side of main housing section 13A are open.

Sub-housing section 13B has a configuration similar to that of the main section, but its volume is slightly reduced so that the sub-section is receivable within the main section in the collapsed state. Sub-housing section 13B is pivotally connected to main section 13A at vertically aligned pivot points 21 and 22 on the roof and floor of the main section, which points are adjacent the front end thereof.

Hence when sub-section 13B, which normally nests within the main section 13A, is rotated 180° about its pivots, it is then extended longitudinally from the main section, as illustrated in FIGS. 5 and 6. In the extended state, sub-section 13B rests on the bow 11 of the chassis and is supported thereby. The longitudinal dimension of the chamber is almost doubled when the sub-section is extended, the chamber having an open port side.

Segments 13C, 13D and 13E are also swingable about pivot points 21 and 22. The heights of sub-section 13B and of segments 13C, 13D and 13E are progressively stepped so that these housing elements may be telescoped within the main housing section. When extended, the three telescoping segments 13C, 13D and 13E together form an outwardly curved bay section bellying laterally from the body to enlarge the chamber.

Segment 13E is supported on the out-stretched long arm 19, while segment 13D is supported on short arm 17. Segment 13C, the edges of whose floor overlap those of segment 13D and sub-section 13B, is supported thereby.

In practice, removable partitions, ledges, bunks or beds may be provided to break-up the interior living space in any desired manner as well as to afford sleeping accommodations and other facilities. For purposes of simplicity, windows, vents, doors, etc., have been omitted from the drawing.

As shown in FIGS. 5 and 6, when the semgnet and sections are expanded, junctions therebetween are created at lines J1, J2, J3 and J4. In order to weatherproof the body, these junctions must be effectively sealed. This is preferably accomplished in the manner shown in FIGS. 7 and 8 where it will be seen that a strip 23 having a triangular cross-section is affixed adjacent the edge of one panel member 24, which may be one of the two body elements forming a junction, and a complementary strip 25 is mounted on the other panel member 26.

Strip 25 is not affixed to panel member 26 but is slidably mounted thereon on a pin 27. Strip 25 is biased by a spring 28 such that, as shown in FIG. 8, when the body is expanded and panels 24 and 26 are shifted relative to each other, strip 23 engages slidable strip 25 and forces it against the action of spring 28 along pin 27 to the end thereof. The spring 28 then serves to urge strip 25 against strip 23 to maintain a weatherproof seal.

While there have been shown and described preferred embodiments of an extensible camping trailer, in accordance with the invention, it will be appreciated that many changes and modifications may be made therein without, however, departing from the essential spirit of the invention.

I claim:

1. A collapsible housing body for use as a trailer comprising:
   A. a box-like main housing section having an open end and an open side,
   B. a similarly shaped sub-housing section of slightly reduced volume receivable within said main section and pivoted thereto at a point adjacent the open end thereof whereby when the sub-section is rotated 180° and thereby extended from the main housing section, the resultant chamber is longitudinally expanded and has an open side, C. a plurality of telescoping housing segments pivoted on said point and nestable within said main section, said segments when expanded, enclosing said open-side to define a bay section laterally expanding said chamber, and D. a chassis supporting said housing body and front end of the chassis whose rear end is mounted on wheels, the front end of the chassis having an extension to support said sub-housing when it is extended.

2. A body as set forth in claim 1, wherein said sections and said segments are provided with matching convex end walls.

3. A body as set forth in claim 1, wherein said sections and said segments are formed by reinforced fiber glass panels.

4. A body as set forth in claim 1, wherein said sections and said segments are formed by aluminum panels having a honeycomb core.

5. A body as set forth in claim 1, wherein said segments are formed by three internesting wedge-shaped housing elements.

6. A body as set forth in claim 1, further including pivoted side arms on said chassis, which when outstretched, support segments of said body in the expanded state.

* * * * *